United States Patent
Ozols et al.

(10) Patent No.: US 12,206,839 B2
(45) Date of Patent: Jan. 21, 2025

(54) VOLUMETRIC DISPLAY UNIT

(71) Applicant: Lightspace Technologies, SIA, Marupes novads (LV)

(72) Inventors: Ainars Ozols, Siguldas novads (LV); Ilmars Osmanis, Mārupes novads (LV); Kriss Osmanis, Babītes nov. (LV); Roberts Zabels, Riga (LV); Martins Narels, Riga (LV)

(73) Assignee: Lightspace Technologies, SIA, Marupes novads (LV)

( * ) Notice: Subject to any disclaimer, the term of this patent is extended or adjusted under 35 U.S.C. 154(b) by 0 days.

(21) Appl. No.: 18/072,282

(22) Filed: Nov. 30, 2022

(65) Prior Publication Data
US 2024/0179293 A1    May 30, 2024

(51) Int. Cl.
*H04N 13/395* (2018.01)
*H04N 13/332* (2018.01)

(52) U.S. Cl.
CPC ......... *H04N 13/395* (2018.05); *H04N 13/332* (2018.05)

(58) Field of Classification Search
CPC ......... G02F 1/133305; G02F 1/133345; G02F 1/133502; G02F 1/133565; G02F 1/133742; G02F 1/13439; G02F 1/13471; G02F 1/133792; G02F 2202/42
See application file for complete search history.

(56) References Cited

U.S. PATENT DOCUMENTS

| | | | |
|---|---|---|---|
| 2016/0208168 A1* | 7/2016 | Iwashita | G02F 1/1368 |
| 2020/0209669 A1* | 7/2020 | Osmanis | G02F 1/137 |
| 2024/0054743 A1* | 2/2024 | Li | G06F 3/04845 |

* cited by examiner

*Primary Examiner* — Nelson M Rosario
(74) *Attorney, Agent, or Firm* — Ziegler IP Law Group LLC.

(57) ABSTRACT

A volumetric display unit includes two first type of substrate members, each having a corresponding conductive electrode layer formed on at least a portion at a corresponding first side thereof. The volumetric display unit also includes one or more second type of substrate members, each having two conductive electrode layers formed on at least a portion at each one of two opposing sides thereof. Herein, the substrate members are arranged to form a stack, with the first sides facing each other. The volumetric display unit further comprises a plurality of liquid crystal layers, each being separately disposed between two of the conductive electrode layers of two adjacent substrate members of the plurality of substrate members in the formed stack.

20 Claims, 11 Drawing Sheets

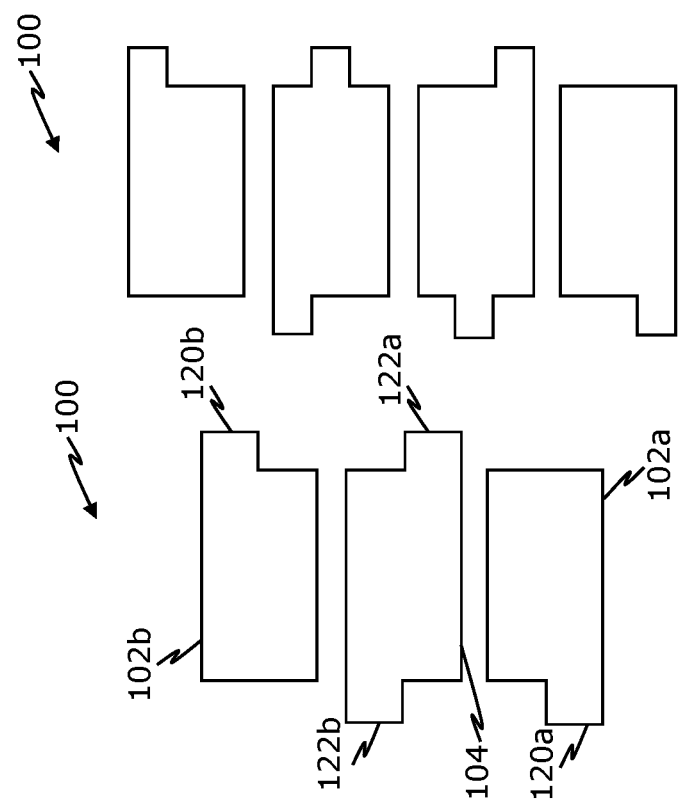
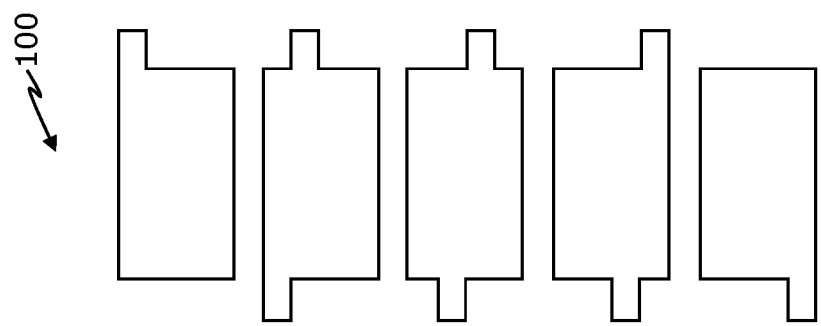
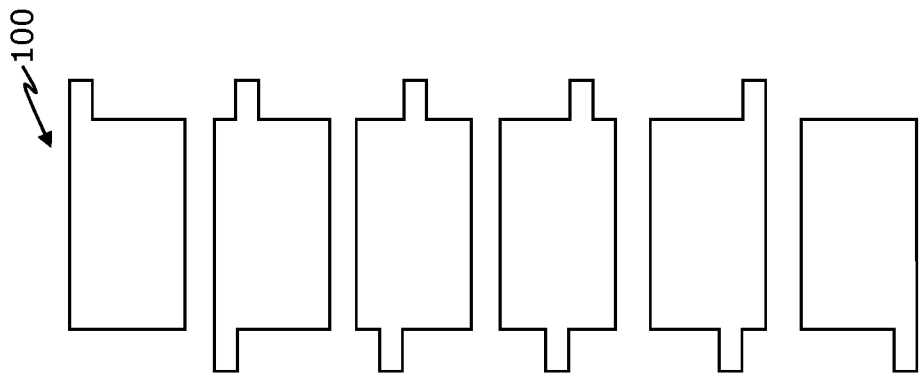
FIG. 5A  FIG. 5B  FIG. 5C  FIG. 5D

VOLUMETRIC DISPLAY UNIT

TECHNICAL FIELD

The present disclosure, generally, relates to a three-dimensional display apparatus such as a head-mounted near eye display and a heads-up display; and in particular to a volumetric display unit for such display apparatus and a method of manufacturing therefor.

BACKGROUND

Multifocal head-mounted or near-to-eye displays provide natural accommodation to the eyes of the viewer, thus overcoming Vergence-accommodation conflict. One of the most perspective architectures for a near-to-eye implementation is utilization of small volumetric screen comprised of switching liquid crystal diffuser elements, wherein the image source is a miniature projector. When such a technology has to be miniaturized in the application of virtual or augmented reality, one of the routes is to miniaturize the area of the screen element and to utilize an eyepiece optics with higher optical power. When doing so, one should take into account reasonable spacing of virtual image or focus planes. For example, it is preferable if the distance in the diopter space between consecutive focal planes is between 0.4 D-0.8 D. Nevertheless, when using eyepiece optics with higher optical power, their effective focal length decreases, which puts a demand on physical spacing of the active diffuser layers. With higher optical powers of the eyepiece, the spacing of active layers within the volumetric screen element should also be reduced to maintain preferable virtual image plane spacing.

Nonetheless, prior-art devices are built with a conventional process of manufacturing individual diffuser elements comprised of two transparent substrates treated on one side with a transparent conductive electrode layer, and with an active liquid crystal layer in between. Typically, the substrate of choice is a thin optical display glass with thickness of 0.3-0.6 mm, and a typical layer of optical cement used for laminating together multiple diffuser elements has a thickness of 5-80 microns. In such conventional device, when multiple diffuser elements are laminated together, there is a double thickness of a substrate and a layer of optical cement/adhesive between two adjacent liquid layers. Consequently, when implementing near-eye display optical architectures with high magnifying power, the double substrate thickness can become too excessive to be convenient and optimal, from the standpoint of comfortable viewing and optical separation of available multiple image focus planes.

A commonly employed provision to overcome this issue is to choose thinner substrate materials. Nevertheless, processing of ultrathin substrates, for example glass sheets with a thickness of less than 0.2 mm, becomes challenging and requires additional processing steps. Even mineral glass substrates at such thickness are highly flexible, and thus for processing steps required in the manufacturing process of diffuser element have to be mounted on a more rigid carrier support which complicates processing and can cause higher failure rate. Furthermore, when laminating together multiple diffuser elements with an optical adhesive/cement, a situation when a refractive index of an optical cement is not ideally matched to that of a substrate material can occur and during use of the multi-focal screen within a near-eye display would result in unwanted reflections of light from the interfaces between the optical adhesive and the substrate. Essentially lamination of diffuser elements creates additional internal interfaces within the multi-layer optical element (volumetric screen module), which are source for unwanted reflections and reduced image contrast, possibly ghost image formation.

Therefore, in light of the foregoing discussion, there exists a need for a better solution to reduce a physical separation between active liquid crystal layers within the multi-plane optical element, used for generating a multifocal image in a multifocal near-eye display architecture.

SUMMARY OF THE INVENTION

The present disclosure seeks to provide a volumetric display unit with closely spaced active (light-scattering) layers. Furthermore the disclosure seeks to provide arrangement to form thin stack of active (liquid crystal) layers of a volumetric display. The present disclosure also seeks to provide a display apparatus with multifocal near-eye display architecture for applications such as head-mounted near eye displays and head-up displays and related display solutions—direct-view volumetric displays. The present disclosure further seeks to provide a method of manufacturing such volumetric display unit.

In one aspect, an embodiment of the present disclosure provides a volumetric display unit comprising:
  a plurality of substrate members comprising:
    two first type of substrate members comprising a first substrate member and a second substrate member, wherein the first substrate member comprises a conductive electrode layer formed on at least a portion at a first side thereof and the second substrate member comprises a conductive electrode layer formed on at least a portion at a first side thereof; and
    one or more second type of substrate members, wherein each of the second type of substrate members comprises two conductive electrode layers, with each one of the two conductive electrode layers formed on at least a portion at each one of two opposing sides thereof,
    wherein the plurality of substrate members are arranged to form a stack, such that the two first type of substrate members form outer layers of the stack, with the first sides of the two first type of substrate members facing each other, and the second type of substrate members form inner layer(s) of the stack sandwiched between the two first type of substrate members; and
  a plurality of liquid crystal layers, wherein each one of the plurality of liquid crystal layers is separately disposed between two of the conductive electrode layers of two adjacent substrate members of the plurality of substrate members in the formed stack.

In another aspect, an embodiment of the present disclosure provides a method of manufacturing a volumetric display unit, the method comprising:
  providing a first substrate member, of two first type of substrate members, comprising a conductive electrode layer formed on at least a portion at a first side thereof;
  adding a volume of liquid crystal material to fill a space corresponding to at least a part of (or entire) the conductive electrode layer on the first side of the first substrate member up to a predefined thickness, to form one of liquid crystal layer of a plurality of liquid crystal layers;
  arranging one or more second type of substrate members on to the formed liquid crystal layer of the plurality of liquid crystal layers, wherein each of the second type of substrate members comprises two conductive electrode layers, with each one of the two conductive electrode layers formed on at least a portion at each one of two opposing sides thereof, and wherein each of the second type of substrate members has one liquid crystal layer dispensed thereon of the plurality of liquid crystal layers associated with each one of the two conductive electrode layers of adjacent substrate members; and arranging a second substrate member, of the two first type of substrate members, comprising a conductive electrode layer formed on at least a portion at a first side thereof on to the one or more second type of substrate members, with the first sides of the two first type of substrate members facing each other, to form a stack.

In yet another aspect, an embodiment of the present disclosure provides a display apparatus comprising a volumetric display unit as described in the preceding paragraphs.

Embodiments of the present disclosure substantially eliminate or at least partially address the aforementioned problems in the prior art and provides a multilayer volumetric screen element with closely spaced active (light-scattering) layers for applications in multifocal near-eye display architectures, direct-view volumetric displays and derivative display solutions.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIGS. 5A to 5D are simplified illustrations of multiple substrate members in the volumetric display unit, in accordance with different embodiments of the present disclosure;

Figure 1A:
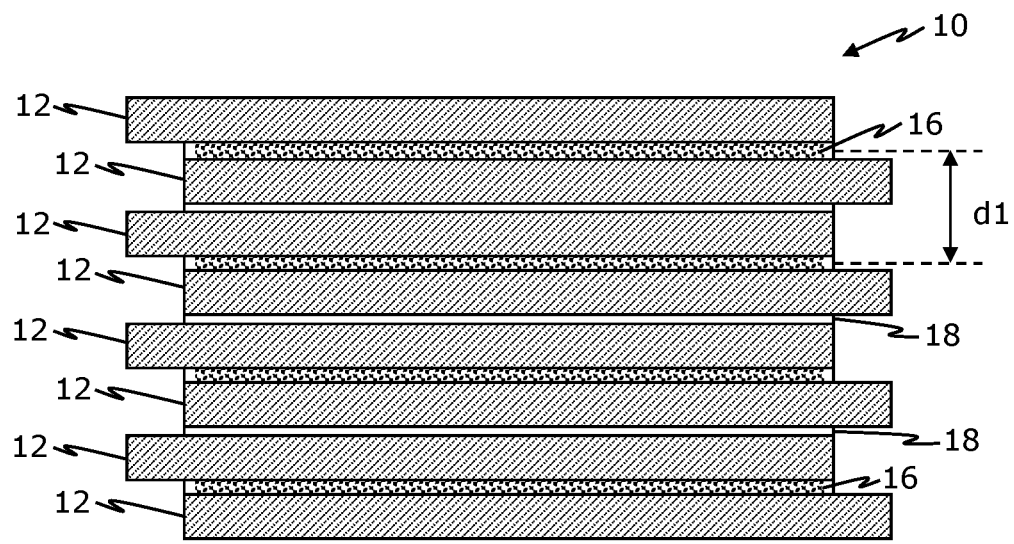
FIG. 1A is a simplified illustration of a conventional volumetric display unit, in accordance with prior art.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a volumetric display unit comprising:

a plurality of substrate members comprising:

two first type of substrate members comprising a first substrate member and a second substrate member, wherein the first substrate member comprises a conductive electrode layer formed on at least a portion at a first side thereof and the second substrate member comprises a conductive electrode layer formed on at least a portion at a first side thereof; and one or more second type of substrate members, wherein each of the second type of substrate members comprises two conductive electrode layers, with each one of the two conductive electrode layers formed on at least a portion at each one of two opposing sides thereof, wherein the plurality of substrate members are arranged to form a stack, such that the two first type of substrate members form outer layers of the stack, with the first sides of the two first type of substrate members facing each other, and the second type of substrate members form inner layer(s) of the stack sandwiched between the two first type of substrate members; and a plurality of liquid crystal layers, wherein each one of the plurality of liquid crystal layers is separately disposed between two of the conductive electrode layers of two adjacent substrate members of the plurality of substrate members in the formed stack.

In another aspect, an embodiment of the present disclosure provides a method of manufacturing a volumetric display unit, the method comprising:

providing a first substrate member, of two first type of substrate members, comprising a conductive electrode layer formed on at least a portion at a first side thereof;

adding a volume of liquid crystal material to fill a space corresponding to at least a part of the conductive electrode layer on the first side of the first substrate member up to a predefined thickness, to form one of liquid crystal layer of a plurality of liquid crystal layers;

arranging one or more second type of substrate members on to the formed liquid crystal layer of the plurality of liquid crystal layers, wherein each of the second type of substrate members comprises two conductive electrode layers, with each one of the two conductive electrode layers formed on at least a portion at each one of two opposing sides thereof, and wherein each of the second type of substrate members has one liquid crystal layer of the plurality of liquid crystal layers associated with each one of the two conductive electrode layers of adjacent substrate members; and arranging a second substrate member, of the two first type of substrate members, comprising a conductive electrode layer formed on at least a portion at a first side thereof on to the one or more second type of substrate members, with the first sides of the two first type of substrate members facing each other, to form a stack.

In another aspect, an embodiment of the present disclosure provides a display apparatus comprising a volumetric display unit as described in the preceding paragraphs.

The present disclosure provides the volumetric display unit. Herein, the volumetric display unit is an electro-optical unit arranged with respect to an image projection unit (as known in the art) of the display apparatus to receive projected images planes. The volumetric display unit comprises a plurality of optical diffuser elements (such as substrates with conductive coatings and liquid crystal layers associated therewith, as discussed later in more detail) that are operable to be sequentially enabled to display the image portion (or the image slice) of the 3D image (or video) thereon.

Furthermore, when various portions of the 3D imagery content are sequentially displayed on the plurality of optical diffuser elements at a fast cycling rate (or image refresh rate), a viewer perceives the 3-dimensional nature (or depth) associated with the three-dimensional image content.

The present volumetric display unit includes the plurality of substrate members. Herein, the plurality of substrate members includes first type of substrate members and second type of substrate members. In particular, the plurality of substrate members includes two first type of substrate members, and one or more second type of substrate members. In an example, the one or more second type of substrate members may include from 1 to 100 number of second type of substrate members. In preferred examples, the one or more second type of substrate members may include from 2 to 8 number of second type of substrate members. In general, each of the plurality of substrate members, including the first type of substrate members and the second type of substrate members, may have same construction. In an example, each of the plurality of substrate members of the volumetric display unit may be rectangular in shape. Further, in an example, each of the plurality of substrate members of the volumetric display unit may be constructed by using an optically transparent insulating material.

In the present examples, the two first type of substrate members includes the first substrate member and the second substrate member. The first substrate member has a first side and a second side, which form opposing longitudinal surfaces thereof. Similarly, the second substrate member has a first side and a second side, which form opposing longitudinal surfaces thereof. Further, each of the second type of substrate members has two opposing sides, which form opposing longitudinal surfaces thereof.

In the plurality of substrate members, the first substrate member includes the conductive electrode layer formed on at least a portion at the first side thereof. Similarly, the second substrate member includes a conductive electrode layer formed on at least a portion at the first side thereof. In an example, the conductive electrode layers may be formed on entire respective surface areas of the respective first sides of the first substrate member and the second substrate member. In other examples, the conductive electrode layers may be formed on a section (corresponding to the said portion) which may be in a range of 50% to 90% of respective surface areas of the respective first sides of the first substrate member and the second substrate member. Generally, the corresponding portions with the conductive electrode layers at the respective first sides of both of the first substrate member and the second substrate member may be complementary to each other.

Further, each of the second type of substrate members includes two conductive electrode layers, with each one of the two conductive electrode layers formed on at least a portion at each one of the two opposing sides thereof. In an example, the conductive electrode layers may be formed on entire surface areas of the two opposing sides of each of the second type of substrate members. In other examples, the conductive electrode layers may be formed on a section (corresponding to the said portion) which may be in a range of 50% to 90% of surface areas of the two opposing sides of each of the second type of substrate members. Generally, the corresponding portions with the conductive electrode layers at the two opposing sides of each of the second type of substrate members may be complementary to each other.

In one or more examples, the said conductive transparent electrode layers may be in the form of coatings formed on the respective first sides of the first substrate member and the second substrate member, as well as the two opposing sides of each of the second type of substrate members. In some examples, the said conductive electrode layers may be constructed using an optically transparent and conducting material, such as doped Zinc oxide (ZnO), metallic nanowire mesh, graphene and so forth. Alternatively, in some examples, the said conductive electrode layers may be constructed using an optically transparent conductive material, such as an indium tin oxide (ITO) without any limitations.

Furthermore, in one embodiment, the optically transparent electrodes, at least in partial area corresponding to that of a disposed liquid crystal, are overcoated with adjacent transparent insulating barrier layer. The insulating barrier layers can be for example $SiO_2$, $SiO_xN_y$ or similar, alternatively organic materials also are possible. The insulating barrier layer helps limiting free ion and contaminant migration from the electrode and substrate layers within the liquid crystal layer. In addition, the insulating barrier or dielectric layer can be configured to act as an alignment layer—thus participating in the improvement of switching characteristics of liquid crystal diffuser elements forming the volumetric screen stack. Furthermore, optical properties of dielectric barrier layers can be chosen or tailored to address internal index of refraction matching between the liquid crystal layer and the electrode/substrate layer. The dielectric barrier layer can be implemented as a single coating or as a series or a stack of dense coatings/thin films. Its effect in addition to above is to improve the dielectric breakdown characteristics of the diffuser element.

In the present embodiments, the plurality of substrate members are arranged to form the stack, such that the two first type of substrate members form outer layers of the stack, with the first sides of the two first type of substrate members facing each other, and the second type of substrate members form inner layer(s) of the stack sandwiched between the two first type of substrate members. That is, the plurality of substrate members are arranged one above the other to form the stack with the first substrate member and the second substrate member forming the outer layers of the stack, and the second type of substrate members forming the inner layer(s) of the stack. Further, the first substrate member and the second substrate member may be so arranged such that the corresponding first sides form respective inner sides thereof, and the corresponding second sides form respective outer sides thereof. Herein, the corresponding second sides of the first substrate member and the second substrate member may as well form outer sides of the stack. Further, herein, the corresponding first sides of the first substrate member and the second substrate member are disposed to be facing each other in the formed stack. Moreover, it may be contemplated that the corresponding conductive electrode layers associated with the first substrate member and the second substrate member, as arranged on the first (inner) sides of the first substrate and the second substrate respectively, are also facing each other.

The volumetric display unit further includes the plurality of liquid crystal layers, wherein each one of the plurality of liquid crystal layers is separately disposed between two of the conductive electrode layers of two adjacent substrate members of the plurality of substrate members in the formed stack. That is, the volumetric display unit has one of the plurality of liquid crystal layers disposed (sandwiched) between the two of the conductive electrode layers of the two adjacent substrate members of the plurality of substrate members. In other words, one of the plurality of liquid crystal layers is disposed between each pair of the plurality of substrate members in the formed stack. Thereby it may be understood that in the volumetric display unit of the present disclosure, a total number of substrates in the plurality of substrate members in the formed stack is one more than a total number of liquid crystal layers in the plurality of liquid crystal layers. In other words, the total number of substrates is 'N+1', where 'N' is the number of liquid crystal layers.

In an embodiment the liquid crystal is contained within the space between two adjacent substrates by means of circumscribing gasket member, which is deposited around the outer perimeter of corresponding substrate members to contain the liquid crystal. As an example the conductive electrode layers is additionally, at least in a region circumscribed by a gasket member, coated with a dense dielectric barrier and alignment layer.

In one embodiment of the disclosure, the utilized liquid crystal is of cholesteric or chiral nematic variety. It is comprised of a nematic base and a chiral doping agent. Furthermore, the utilized solution is substantially free of polymer stabilizing networks. That is, the utilized liquid crystal variety is a polymer-free cholesteric (chiral nematic) liquid crystal. Utilization of such liquid crystal is beneficial in the context of volumetric screen element, as it provides substantially long-lived super scattering optical state, which is measured on the order of milliseconds. It was observed that omission of polymer additives facilitates improved switching speeds between optical states utilized in display devices. Indeed the liquid crystal layers are (can be according to an embodiment) of polymer-free cholesteric liquid crystal variety.

It may be appreciated that in the present volumetric display unit, both the first substrate member and the second substrate member are "single-sided" substrates having the conductive electrode layer formed on only one side (respective first sides) thereof, while each of the second type of substrate members is a "double-sided" substrate having the conductive electrode layers formed on both of the respective two opposing sides thereof. Further, the said "single-sided" substrates are used as the outermost substrates with conductive electrode layers facing inwards towards the corresponding liquid crystal layer, whereas the said "double-sided" substrates are used as inner substrates (layers). Thus, the present volumetric display unit provides construction of a multi-layer screen element as a consecutive stack of substrates with liquid crystal layers encased in between.

In the present embodiments, such arrangement may be achieved by first providing one of two first type of substrate members, with each of the first type of substrate members having the conductive electrode layer formed on at least a section of one side thereof. Then, the one or more second type of substrate members may be arranged on to the said one of two first type of substrate members, with each of the second type of substrate members having the conductive electrode layer formed on at least a section of both opposing sides thereof. Further, other of the two first type of substrate members may be disposed on to the arranged one or more second type of substrate members to form the stack, such that the first type of substrate members form outer layers of the stack, and the second type of substrate members form inner layers of the stack, sandwiched between the first type of substrate members. Furthermore, the plurality of liquid crystal layers may be formed, with each one of the plurality of liquid crystal layers being separately disposed between two of the conductive electrode layers of two adjacent substrate members, including the first type of substrate members and the second type of substrate members, in the formed stack.

In some embodiments, the second side (i.e., outer side) of at least one of the first substrate and the second substrate may be provided with one or more of an anti-reflective coating, an oleophobic coating, a hydrophobic coating, a tempered glass. It may be understood that the second sides of the first substrate and the second substrate are outermost surfaces of the stack which may be exposed to environment conditions like stray lights, dust, dirt, etc., therefore it may be desired to provide extra protection coating(s) thereto. In other examples, the second sides of the first substrate and the second substrate may be laminated with a tough, scratch resistant, impact resistant, light-transparent material layer preventing and protecting the volumetric display unit from outside damage.

In one or more embodiments, the volumetric display unit further includes a gasket member arranged between the two of the conductive electrode layers of two adjacent substrate members of the plurality of substrate members in the formed stack. In particular, the volumetric display unit has one gasket member disposed (sandwiched) between the two of the conductive electrode layers of the two adjacent substrate members of the plurality of substrate members. In other words, since each pair of the two adjacent substrate members of the plurality of substrate members has one of the plurality of liquid crystal layers associated therewith, therefore the volumetric display unit has one gasket member corresponding to each of liquid crystal layers in the plurality of liquid crystal layers. In an example, the gasket member is in the form of a polymer seal as known in the art.

In one or more embodiments, the gasket member circumscribes the corresponding one of the plurality of liquid crystal layers disposed therewith. That is, each one of the plurality of liquid crystal layers is bound from its sides in place by the gasket member deposited around a perimeter of the corresponding liquid crystal layer associated therewith. In other words, the liquid crystal layer is encased between two adjacent substrate members and further sealed by the gasket member on the outer perimeter thereof.

In the volumetric display unit of the present disclosure, a thickness of the liquid crystal layers is typically in the order of microns up to tens of microns. In the present embodiments, a thickness of each one of the liquid crystal layers is in a range of 4 to 30 microns. In one or more examples, the thickness of each one of the liquid crystal layers is in a range of 4 microns, 8 microns, 12 microns, 16 microns, 20 microns, 24 microns, 28 microns up to 8 microns, 12 microns, 16 microns, 20 microns, 24 microns, 28 microns, 30 microns. For instance, the thickness of each one of the liquid crystal layers is, for example, 4, 6, 8, 10, 15, 20, 30 microns.

In the present volumetric display unit having multi-layer screen elements, in contrast to prior-art screen element, connection of electrodes to external driving circuitry becomes challenging, as substrates are very closely spaced, leaving the separation corresponding to the thickness of the active layer which, as discussed, is typically in the order of microns up to tens of microns. Therefore, as may be understood, it becomes challenging to provide connections to the internal layers of the stack.

In the present embodiments, the first substrate member includes a projected portion extending from an edge of the portion onto which the extension of the conductive electrode layer is formed thereat. Similarly, the second substrate member includes a projected portion extending from an edge of the portion onto which the extension of the conductive electrode layer is formed thereat. Further, each of the second type of substrate members includes two projected portions extending from one or more edges of the portion onto which the corresponding two extensions of conductive electrode layers are formed thereat. Also, the first substrate member includes a connection terminal disposed on the projected portion thereof. Similarly, the second substrate member includes a connection terminal disposed on the projected portion thereof. And, further, each of the second type of substrate members includes two connection terminals, with each one of the two connection terminals disposed on different one of the two projected portions thereof. This way the present volumetric display unit provides structuring of the substrate members for enabling easy access for external connections to the conductive electrode layers (transparent conductive electrodes). Further, in the present embodiments, the connection terminals of the plurality of substrate members in the formed stack are non-overlapping.

In an embodiment, the volumetric display unit may employ a single side connection approach. In this case, each of the plurality of substrate members in volumetric display unit (multi-layer screen element) are made larger on one side to define the corresponding projected portion. In an example, such side extension of each of the plurality of substrate members for the corresponding projected portion may vary from 1% up to 30% of corresponding length (dimension) of the said one side. In preferred examples, the corresponding projected portion may be about 2% to 10% of corresponding length (dimension) of the said one side. It may be appreciated that the said side extension is foreseen beyond the corresponding liquid crystal layer (active region) and the gasket member for each of the plurality of substrate members, in order to house respective connection terminal(s). Further, in the present embodiment, region corresponding to the side extension is divided into 'M' number of segments, where 'M' is a total number of liquid crystal layers in the volumetric display unit. The projections of the segments are projected onto corresponding substrate members to form a ladder-like arrangement. For each substrate member, its corresponding projection of the segment is the connection terminal, whereas the remaining part of the corresponding extension region of the given substrate member is removed. With such approach access to all of the conductive electrode layers in the volumetric display unit is granted for external connections. It may be understood that herein each of the two first type of substrate members (outermost substrates) have a single connection (as these are single-sided substrates with the conductive electrode layer being coated only on the first side (inward face)) where the corresponding connection terminal is on the respective projected portion, while each of the one or more second type of substrate members (inner substrates) has double-sided connections where the corresponding connection terminals are on both sides of the respective projected portions.

It may be appreciated that as the number of substrate members increases in the volumetric display unit, the corresponding projected portions housing the respective connection terminals becomes smaller. Thus, for the volumetric display unit with a larger number of substrate members, a single-sided connection approach may not be feasible in most cases.

In another embodiment, the volumetric display unit may employ a double-sided connection approach. In this case, each of the one or more second type of substrate members in volumetric display unit is extended beyond the corresponding liquid crystal layer and the gasket member on two opposite sides to define the corresponding projected portions therefor, while each of the two first type of substrate members (outermost substrates) is extended beyond corresponding liquid crystal layer and the gasket member on one side only to define the corresponding projected portion therefor. Similar to approach described in the preceding paragraph, for each of the plurality of substrate members, only a segment of the respective projected portion is left, while the remaining part is removed, thus forming a ladder-like structure on both sides. With this approach the difference (in comparison to the above described approach) is that the connection terminals can be single-sided on all substrate members, meaning that inner substrates may be configured to receive electrode connection on one side only. In some situations, this might be preferential and beneficial, for example, for integration of the volumetric display unit within a head-mounted display device, and the like.

It may be understood that in case of double-sided connection approach, a number of projected portions on each side of the volumetric display unit (i.e., common side of the plurality of substrate members therein) is proportional to a number of liquid crystal layers therein. In other words, for the volumetric display unit with three substrate members (i.e., two first type of substrate members and only one second type of substrate member), and thus having two number of liquid crystal layers; each of two opposing (longitudinal) sides of such volumetric display unit may have two of projected portions therein. In particular, on one such side, one of the two first type of substrate members may have corresponding projected portion and the second type of substrate member may have one of corresponding two projected portions; and on other side, other one of the two first type of substrate members may have corresponding projected portion and the second type of substrate member may have other one of corresponding two projected portions.

In still another embodiment, the volumetric display unit may employ a multi-sided connection approach. For instance, if a double-sided connection may not be feasible due to area of the projected portion(s) in the substrate members being too small to properly provide corresponding connection terminal(s), in such case, it is possible to use a larger number of even smaller projected portions. That is, it is possible to expand the principle and utilize three or all four sides of the substrate members (i.e., expanding the substrate members on all four sides from the corresponding active regions and performing corresponding patterning). Further, this approach might be necessary in case of very small active region of the substrate members in the volumetric display unit, in order for not to expand a final footprint of the volumetric display unit too much to accommodate for the connection terminals.

As discussed, since the side of the volumetric display unit which is devoted to providing connection terminals for the corresponding conductive electrode layer would typically be divided into 'M' segments (where 'M' is the number of active layers); now if a length of a side of a substrate member is "a", then a length of a corresponding projected portion (representing the corresponding connection terminal) would be a/M-x, where 'x' is a small overlap exclusion correction constant such that x<<a/N.

In one or more embodiments, each one of the conductive electrode layers has a notch formed therein. It may be understood that as the liquid crystal layer(s) can be subjected to a relatively high electric field intensity, the gasket member and further the region outside the gasket member, i.e., around the connection terminals, may also be subjected to high electric field intensity and may thus cause discharge through air, which is not desired. Thus, in the present embodiments, each one of the conductive electrode layers, in particular, the opposed conductive electrode layers to the corresponding liquid crystal layers, are patterned (disrupted) to define the notch so as cut the electric connection and therefore not to subject the gasket member and the region around the connection terminals to these high electric field intensities, preventing electric discharge through air. In the present examples, the small overlap exclusion correction constant 'x' for the projected portion as described in the preceding paragraph may correspond to an area of the notch defined in the corresponding one of the conductive electrode layers.

The present disclosure further provides a method of manufacturing a volumetric display unit (such as, the volumetric display unit as described in the preceding paragraphs). The various embodiments and variants disclosed above for the volumetric display unit apply mutatis mutandis to the present method. As may be appreciated by a person skilled in the art that assembly process of gapless multi-layer optical diffuser element can be complicated. Not always a pre-cut substrate assembly can yield optimum result, mostly due to misalignments. Though using pre-cut substrate assembly is a completely valid approach, a preferable and more convenient way of forming gapless multilayer stack of substrate elements is to assemble uncut substrates (for example of rectangular shape) and perform substrate patterning post assembly, when the liquid crystal layer(s) have been formed and the gasket member(s) have been deposited.

For this purpose, firstly, the present method includes providing the first substrate member, of the two first type of substrate members, including the conductive electrode layer formed on at least the portion at the first side thereof. In some embodiments, the method further includes forming the notch in each one of the conductive electrode layers. It may be contemplated that the notch may be pre-formed (patterned) in the substrate members while coating with the corresponding conductive electrode layers thereat. In an example, the notch may be formed as a disruption in the corresponding conductive electrode layer.

The method further includes adding a volume of liquid crystal material to fill a space corresponding to the conductive electrode layer on the first side of the first substrate member up to a predefined thickness, to form one of liquid crystal layer of a plurality of liquid crystal layers. In the present embodiments, beforehand, the method includes disposing the gasket member onto the first substrate member to define the space for adding the volume of liquid crystal material to form one of liquid crystal layer of the plurality of liquid crystal layers, such that the gasket member is arranged between the two of the conductive electrode layers of two adjacent substrate members of the plurality of substrate members in the formed stack and circumscribes the corresponding one of the plurality of liquid crystal layers disposed therewith.

In one or more embodiments, the method includes utilizing one-drop-fill (ODF) technique to add the volume of liquid crystal material. In such a way the stack-up process would preferably utilize the ODF technique for filling the liquid crystal material. The gasket member would be deposited on the first substrate, and a precalculated volume of the liquid crystal material would be deposited (together with cell-gap spacers), then the following substrate is positioned on top (as discussed in the proceeding paragraphs), subsequently the gasket member is cured (by UV light), and the process is repeated until the full stack is created (as discussed hereinafter). Alternatively, the liquid crystal material is deposited without addition of cell-gap spacers. This is beneficial for the case in which a very small aperture volumetric screen is created. Due to small active area, omission of cell-gap spacers within the volume of liquid crystal layer can promote improved image quality by omitting unwanted light scattering centres (interfaces between cell-gap spacers and liquid crystal).

The method further includes arranging one or more second type of substrate members on to the formed liquid crystal layer of the plurality of liquid crystal layers, wherein each of the second type of substrate members comprises two conductive electrode layers, with each one of the two conductive electrode layers formed on at least the portion at each one of two opposing sides thereof, and wherein each of the second type of substrate members has one liquid crystal layer of the plurality of liquid crystal layers associated with each one of the two conductive electrode layers. The method further includes arranging the second substrate member, of the two first type of substrate members, comprising the conductive electrode layer formed on at least the portion at the first side thereof on to the one or more second type of substrate members, with the first sides of the two first type of substrate members facing each other, to form the stack.

As discussed, the present volumetric display unit is manufactured by first assembling uncut substrates and then performing substrate patterning post assembly, when the liquid crystal layer(s) have been formed and the gasket member(s) have been deposited. For this purpose, the present method includes cutting the first substrate member to define the projected portion extending from the edge of the portion onto which a extension of the conductive electrode layer is formed thereat; cutting the second substrate member to define the projected portion extending from the edge of the portion onto which the extension of the conductive electrode layer is formed thereat; and cutting each of the second type of substrate members to define the two projected portions extending from one or more edges of the portion onto which the corresponding two extensions of the conductive electrode layers are formed thereat.

Nonetheless, when the stack is finished, it becomes challenging to perform substrate shaping (i.e., performing cutouts for defining the projected portions). The present method includes implementing laser ablation for cutting of the first substrate member, the second substrate member and each of the second type of substrate members in the formed stack. In one or more examples, the present method utilizes laser ablation, for instance, ultra-short pulse laser cutting (by a high-power femtosecond or picosecond laser), for the said purpose of cutting of the first substrate member, the second substrate member and each of the second type of substrate members in the formed stack.

It may be appreciated that during the cutting process, the ablation occurs at the laser focus due to high overall intensity; however, out-of-focus region of the laser beam may also have high enough intensity locally to impact surrounding material. For example, a simple refocusing for the cut line can interfere with the gasket members, the conductive electrode layers, and possibly the liquid crystal layers itself. The present method includes offsetting and/or tilting a laser beam, during implementing the laser ablation, to define edges for the cutting of the first substrate member, the second substrate member and each of the second type of substrate members in the formed stack. That is, for each cut (on each layer), the laser beam is offset and tilted to impact only desired cut line. To ensure safe energy density in the out-of-focus part, the present method provides that a wide beam is focused, thus sharply reducing the energy density moving away from the focus point.

The present method further includes disposing the connection terminal on the projected portion of the first substrate member; disposing the connection terminal on the projected portion of the second substrate member; and disposing two connection terminals on the two projected portions of each of the second type of substrate members, with each one of the two connection terminals disposed on different one of the two projected portions. The method further includes disposing the connection terminals of the plurality of substrate members in the formed stack to be non-overlapping.

The present disclosure further provides a display apparatus including the volumetric display unit as described in the preceding paragraph. The implementation of the present volumetric display unit in the display apparatus may be contemplated by a person skilled in the art and thus not explained herein for the brevity of the present disclosure. The term "display apparatus" as used herein relates to a specialized equipment for presenting the three-dimensional (3D) image to a viewer in a manner that the three-dimensional image truthfully appears to have actual physical depth. In other words, the display apparatus is operable to act as a device for visually presenting the three-dimensional image in a three-dimensional space. The volumetric display unit of the present disclosure is adapted to be implemented with the display apparatus to display three-dimensional images.

As used herein, the term "three-dimensional image" relates to an image that provides a perception of depth to a user. The three-dimensional image may be a volumetric image. Herein, the volumetric image may be an image having a height, a width, and a depth in the three-dimensional space. A given three-dimensional image could be a given volumetric image of at least one three-dimensional object (for example, such as a statue, a vehicle, a weapon, a musical instrument, an abstract design, and the like) or a three-dimensional scene (for example, such as a beach scene, a mountainous environment, an indoor environment, and the like). Moreover, the term "three-dimensional image" also encompasses a three-dimensional computer-generated surface.

The present display apparatus may be employed in applications that require the viewer to perceive the depth of an object displayed within the image. Such a depth of the object is an actual depth (or substantially close to the actual depth) of the object as opposed to a stereoscopic depth of the object that the viewer perceives during stereoscopic reconstruction of object on a two-dimensional plane. For example, the display apparatus may be employed by a product designer designing a product using computer-modelling software to perceive the product being designed from more than one direction at a time. In another example, the display apparatus may be employed for medical application, such as, by a doctor to view a three-dimensional body-scan of a patient.

In an embodiment, the display apparatus is a head-mounted near eye display. Such head-mounted near eye display may include, but not limited to, extended reality (XR) headset including augmented reality (AR) headset, virtual reality (VR) headset, mixed reality (MR) headset, and the like. In an embodiment, the display apparatus is a heads-up display. Such heads-up display may include automotive head-up display and the like.

In the conventional volumetric display unit, an adhesive layer is required and has to have a matched index of refraction to that of the substrate members across the target range of wavelengths not to cause any unwanted reflections. Nevertheless, in practice, it can become challenging to ideally match indices of refraction across a wide range of wavelength between, for example, an inorganic substrate material and a polymer-based adhesive. Furthermore, the number of substrate members used in the conventional volumetric display unit is '2N', where 'N' is the number of liquid crystal layers, corresponding to the number of focal planes within the multi-focal near-eye display architecture. Further, in the conventional volumetric display unit, a spacing distance between two liquid crystal layers is limited by a thickness of two substrate members and the adhesive layer.

In the present volumetric display unit, a total number of the substrate members is 'N+1', where 'N' is the number of the liquid crystal layers, in contrast and comparison to the conventional volumetric display unit with '2N' number of the substrate members. Also, the present volumetric display unit provides possibility to space the liquid crystal layers closer at a spacing distance being only limited by one of the substrate members, in contrast and comparison to the conventional volumetric display unit where the spacing distance is limited by the thickness of two substrate members and the adhesive layer. Thus, due to reduced number of the substrate members and the elimination of the adhesive layers as in the conventional volumetric display unit, the present volumetric display unit has significantly reduced overall thickness in comparison to the conventional volumetric display unit.

The present volumetric display unit further avoids utilization of curable optical polymer, which although can be index matched to substrate members typically will have different dispersion and its index matching performance across the visible spectrum will vary thus degrading performance at the formed substrate/bonding agent interfaces. Instead, the present volumetric display unit utilizes a "build-up" process to form a multi-layer volumetric screen element, thus avoiding unnecessary internal interfaces with jumps in the index of refraction. A homogeneous transition from the region of one substrate member (optical diffuser element), as characterized by the liquid crystal layer (active switching layer) facilitates better light utilization within the present volumetric display unit, as well as improves image contrast and enables formation of compact stacks for implementation within near-eye display architectures.

DETAILED DESCRIPTION OF THE DRAWINGS

Figure 1B:
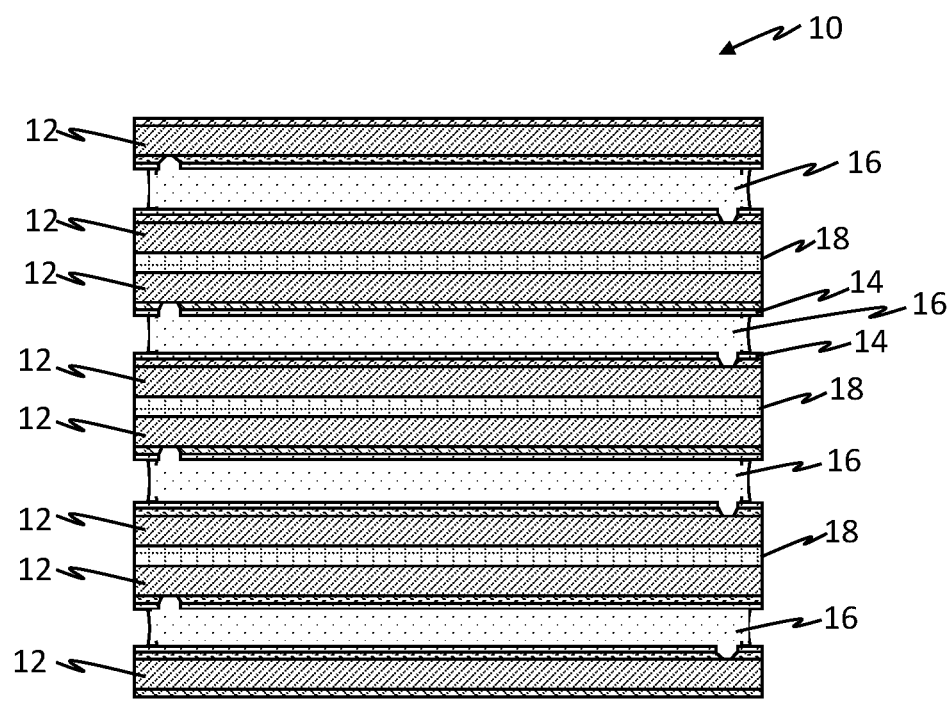
FIG. 1B is a simplified sectioned illustration of the conventional volumetric display unit, in accordance with prior art.

Referring to FIGS. 1A and 1B, in combination, illustrated are illustrations of a conventional volumetric display unit (represented by reference numeral 10), in accordance with prior art. As shown, the conventional volumetric display unit 10 includes individual substrate members 12 (forming liquid crystal diffuser elements). The substrate members 12 coated on an inside (from the perspective of liquid crystal layer, as described further) with conductive electrode layers 14 (such as, transparent electrode (ITO) and dielectric layer) and also provided with liquid crystal layers 16, wherein the dielectric layer of the electrode layers is also serving as the alignment layer for molecules of the liquid crystal layers 16. A preferable alignment for the liquid crystal layers 16 is homeotropic or substantially homeotropic. On the outside, the substrate members 12 are uncoated, the exceptions are the outermost substrate members, which optionally may be coated with anti-reflection coating tuned for visible spectrum. The substrate members 12 are adhered (laminated) together by an adhesive layer 18, including an optical bonding agent, typically a curable (thermo, UV, dual-cure) optical polymer with preferably substantially similar index of refraction at a cured state to that of utilized substrate members 12. Other functional coatings and components have been omitted from the simplified description.

In the conventional volumetric display unit 10, the adhesive layer 18 has to have a matched index of refraction to that of the substrate members 12 across the target range of wavelengths not to cause any unwanted reflections. Nevertheless, in practice, it can become challenging to ideally match indices of refraction across a wide range of wavelength between, for example, an inorganic substrate material and a polymer-based adhesive. Furthermore, the number of substrate members 12 used in the conventional volumetric display unit 10 is '2N', where 'N' is the number of liquid crystal layers 16, corresponding to the number of focal planes within the multi-focal near-eye display architecture. Further, in the conventional volumetric display unit 10, a spacing distance d1 (as shown) between two liquid crystal layers 16 is limited by a thickness of two substrate members 10 and the adhesive layer 18.

Figure 2A:
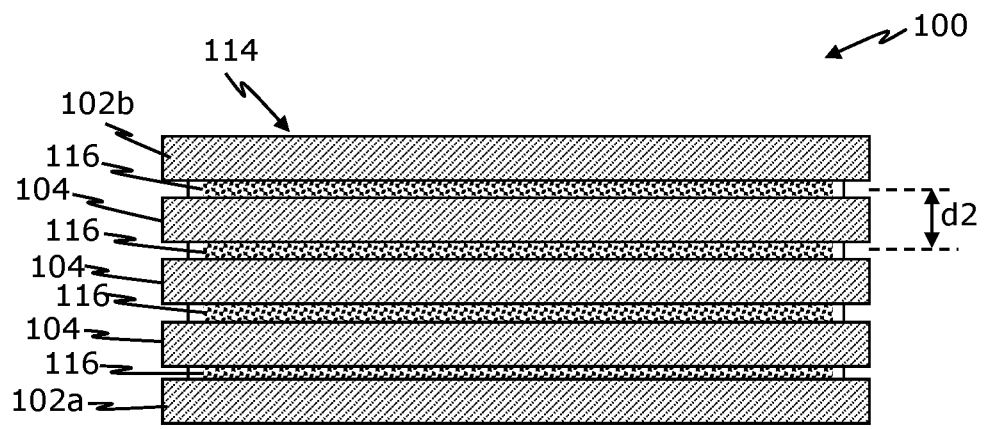
FIG. 2A is a simplified illustration of a volumetric display unit, in accordance with an embodiment of the present disclosure.
Figure 2B:
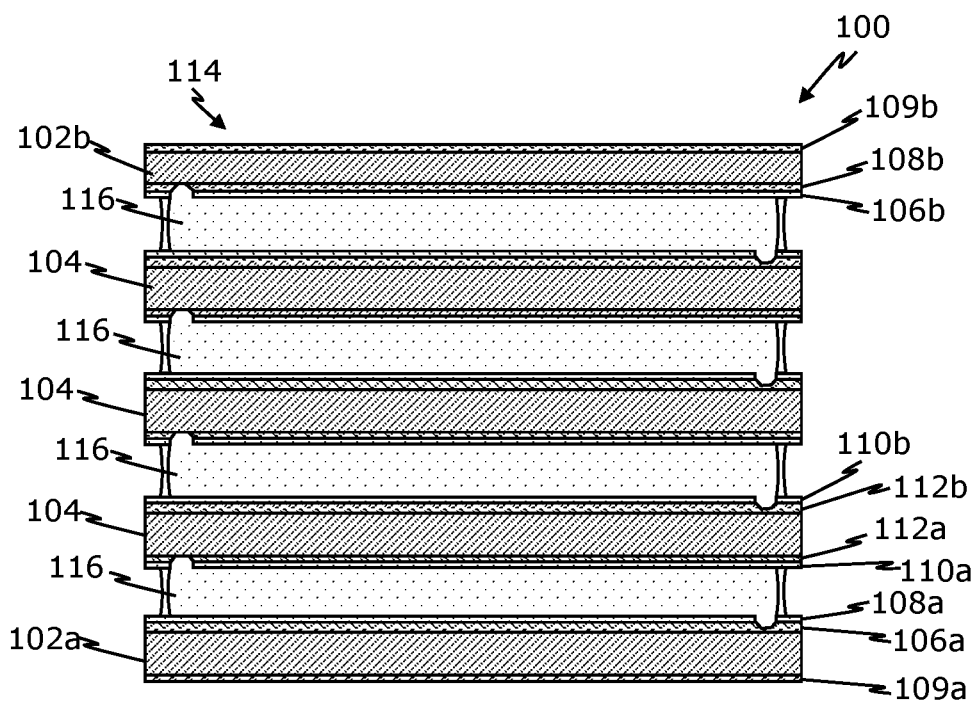
FIG. 2B is a simplified sectioned illustration of the volumetric display unit, in accordance with an embodiment of the present disclosure.

Referring to FIGS. 2A and 2B, in combination, illustrated are illustrations of a volumetric display unit (represented by reference numeral 100), in accordance with an embodiment of the present disclosure. As shown, the volumetric display unit 100 includes a plurality of substrate members 102a, 102b, 104. Herein, the plurality of substrate members 102a, 102b, 104 includes two first type of substrate members 102a, 102b comprising a first substrate member 102a and a second substrate member 102b, and one or more second type of substrate members 104. As better shown in FIG. 2B, the first substrate member 102a comprises a first side 108a and a second side 109a, and the second substrate member 102b comprises a first side 108b and a second side 109b, shown with emphasis as separate layers, although are just surfaces, for clarity. The first substrate member 102a further comprises a conductive electrode layer 106a formed on at least a portion at the first side 108a thereof and the second substrate member 102b comprises a conductive electrode layer 106b formed on at least a portion at the first side 108b thereof. Further, each of the second type of substrate members 104 comprises two conductive electrode layers 110a, 110b, with each one of the two conductive electrode layers 110a, 110b formed on at least a portion at each one of two opposing sides 112a, 112b thereof. Further, as shown, the plurality of substrate members 102a, 102b, 104 are arranged to form a stack 114, such that the two first type of substrate members 102a, 102b form outer layers of the stack 114, with the first sides 108a, 108b of the two first type of substrate members 102a, 102b facing each other, and the second type of substrate members 104 form inner layer(s) of the stack 114 sandwiched between the two first type of substrate members 102a, 102b. Further, as shown, the volumetric display unit 100) includes a plurality of liquid crystal layers 116, wherein each one of the plurality of liquid crystal layers 116 is separately disposed between two of the conductive electrode layers 106a, 106b, 110a, 110b of two adjacent substrate members of the plurality of substrate members 102a, 102b, 104 in the formed stack 114.

The volumetric display unit 100 provides construction of multi-layer screen element as the stack 114 of the plurality of substrate members 102a, 102b, 104 with liquid crystal layers 116 encased in between. The volumetric display unit 100 utilizes two types of substrates, including the two first type of substrate members 102a, 102b and the one or more second type of substrate members 104, where each one of the first type of substrate members 102a, 102b is a "single-sided" substrate having the respective conductive electrode layer 106a, 106b just on one side thereof, while each one of the second type of substrate members 104 is a "double-sided" substrate having the respective two conductive electrode layers 110a, 110b on both sides thereof. Within the volumetric display unit 100, the two first type of substrate members 102a, 102b are used as the outermost substrates with the respective conductive electrode layer 106a, 106b facing inwards towards the corresponding liquid crystal layer 116, whereas the second type of substrate members 104 are used for all other inner substrate layers.

In the present volumetric display unit 100, a total number of the substrate members 102a, 102b, 104 is 'N+1', where 'N' is the number of the liquid crystal layers 116, in contrast and comparison to the conventional volumetric display unit 10 with '2N' number of the substrate members 12. Also, as may be seen, the volumetric display unit 100 provides possibility to space the liquid crystal layers 116 closer at a spacing distance d2 being only limited by one of the substrate members 102a, 102b, 104, in contrast and comparison to the conventional volumetric display unit 10 where the spacing distance d1 is limited by the thickness of two substrate members 12 and the adhesive layer 18. Thus, due to reduced number of the substrate members 102a, 102b, 104 and the elimination of the adhesive layers 18 as in the conventional volumetric display unit 10, the present volumetric display unit 100 has significantly reduced overall thickness in comparison to the conventional volumetric display unit 10.

The present volumetric display unit 100 further avoids utilization of curable optical polymer, which although can be index matched to substrate members typically will have different dispersion and its index matching performance across the visible spectrum will vary thus degrading performance at the formed substrate/bonding agent interfaces. Instead, the present volumetric display unit 100 utilizes a "build-up" process to form a multi-layer volumetric screen element, thus avoiding unnecessary internal interfaces with jumps in the index of refraction. A homogeneous transition from the region of one substrate member (optical diffuser element), as characterized by the liquid crystal layer (active switching layer) facilitates better light utilization within the present volumetric display unit 100, as well as improves image contrast and enables formation of compact stacks for implementation within near-eye display architectures.

Figure 3:
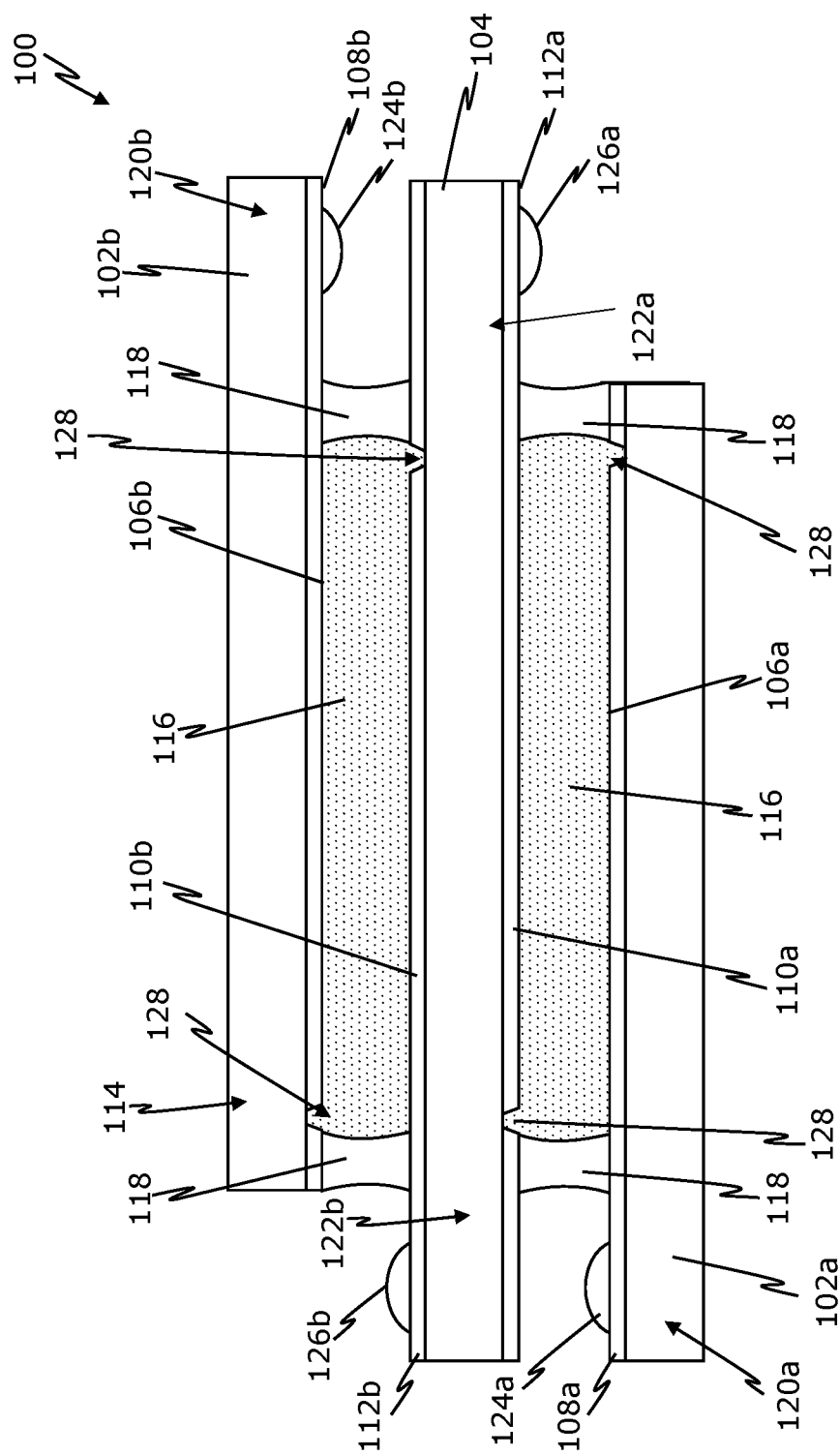
FIG. 3 is a detailed sectioned illustration of the volumetric display unit, in accordance with an embodiment of the present disclosure.

Referring to FIG. 3, illustrated is a detailed sectioned illustration of the volumetric display unit 100, in accordance with an embodiment of the present disclosure. In the illustrated example of FIG. 3, the volumetric display unit 100 has been shown to include only three number of substrate members 102a, 102b, 104 for simplicity. As shown, the volumetric display unit 100 further includes a gasket member 118 arranged between the two of the conductive electrode layers 106a, 110a and 106b, 110b of two adjacent substrate members of the plurality of substrate members 102a, 102b, 104 in the formed stack 114. Herein, the gasket member 118 circumscribes the corresponding one of the plurality of liquid crystal layers 116 disposed therewith. Also, as shown, the first substrate member 102a comprises a projected portion 120a extending from an edge of the portion onto which the extension of the conductive electrode layer 106a is formed thereat. The second substrate member 102b comprises a projected portion 120b extending from an edge of the portion onto which the extension of the conductive electrode layer 106b is formed thereat. Each of the second type of substrate members 104 comprises two projected portions 122a, 122b extending from one or more edges of the portion onto which the corresponding two extensions of conductive electrode layers 110a, 110b are formed thereat. Furthermore, the first substrate member 102a comprises a connection terminal 124a disposed on the projected portion 120a thereof. The second substrate member 102b comprises a connection terminal 124b disposed on the projected portion 120b thereof. Each of the second type of substrate members 104 comprises two connection terminals 126a, 126b, with each one of the two connection terminals 126a, 126b disposed on different one of the two projected portions 122a, 122b thereof. Herein, the connection terminals 124a, 124b, 126a, 126b of the plurality of substrate members 102a, 102b, 104 in the formed stack 114 are non-overlapping. Further, as shown, each one of the conductive electrode layers 106a, 106b, 110a, 110b has a notch 128 formed therein.

Figure 4A:
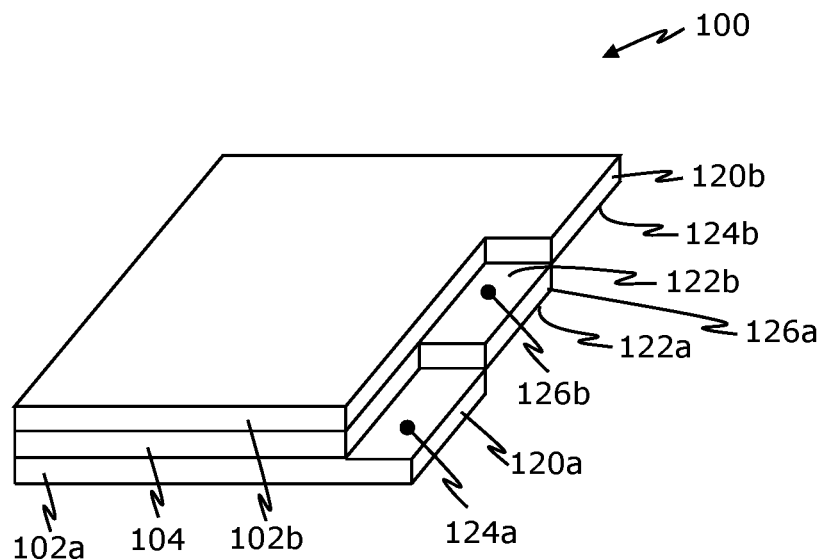
FIG. 4A is a perspective illustration of the volumetric display unit, in accordance with one embodiment of the present disclosure.

Referring to FIG. 4A, illustrated is a perspective illustration of the volumetric display unit 100, in accordance with one embodiment of the present disclosure. Herein, the volumetric display unit 100 employs a single side connection approach. In this case, each of the plurality of substrate members 102a, 102b, 104 are made larger on one side to define the corresponding projected portions 120a, 120b, 122a, 122b. The projected portions 120a, 120b, 122a, 122b provide extensions of corresponding substrate members 102a, 102b, 104 to form a ladder-like arrangement. It may be seen that the second type of substrate member 104 has only one extension with two sides thereof being considered the corresponding two projected portions 122a, 122b. Further, herein, each of the two first type of substrate members 102a, 102b have the corresponding connection terminals 124a, 124b on the respective projected portions 120a, 120b (with the connection terminal 124b being generally represented, as being on lower side and not properly visible), while each of the one or more second type of substrate members 104 has the corresponding connection terminals 126a, 126b on both sides of the respective projected portions 122a, 122b (with the connection terminal 126a being generally represented, as being on lower side and not properly visible).

Figure 4B:
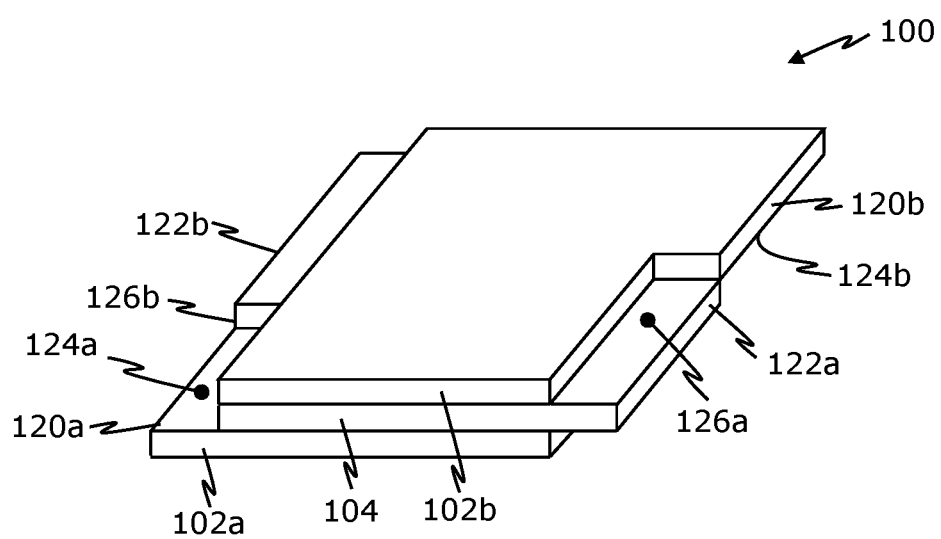
FIG. 4B is a perspective illustration of the volumetric display unit, in accordance with another embodiment of the present disclosure.

Referring to FIG. 4B, illustrated is a perspective illustration of the volumetric display unit 100, in accordance with another embodiment of the present disclosure. Herein, the volumetric display unit 100 employs a double-sided connection approach. In this case, each of the one or more second type of substrate members 104 is extended to define the corresponding projected portions 122a, 122b therefor, while each of the two first type of substrate members 102a, 102b is extended on one side only to define the corresponding projected portion 120a, 120b therefor. Further, herein, each of the two first type of substrate members 102a, 102b have the corresponding connection terminals 124a, 124b on the respective projected portions 120a, 120b (with the connection terminal 124b being generally represented, as being on lower side and not properly visible), while each of the one or more second type of substrate members 104 has the corresponding connection terminals 126a, 126b on both sides of the respective projected portions 122a, 122b (with the connection terminal 126b being generally represented, as being on lower side and not properly visible).

Referring to FIGS. 5A to 5D, illustrated are simplified illustrations of multiple substrate members in the volumetric display unit 100, in accordance with different embodiments of the present disclosure. In particular, FIG. 5A provides the volumetric display unit 100 with three substrate members, FIG. 5B provides the volumetric display unit 100 with four substrate members, FIG. 5C provides the volumetric display unit 100 with five substrate members, and FIG. 5D provides the volumetric display unit 100 with six substrate members. Herein, a number of projected portions (such as, the projected portions 120a, 120b, 122a, 122b on each side of the volumetric display unit 100 is proportional to a number of liquid crystal layers (such as, the liquid crystal layers 116 therein. For instance, as shown in FIG. 5A, for the volumetric display unit 100 with three number of substrate members (i.e., two first type of substrate members 102a, 102b and only one second type of substrate member 104, and thus having two number of liquid crystal layers (not shown); each of two opposing (longitudinal) sides of such volumetric display unit 100 may have two number of projected portions of the projected portions 120a, 120b, 122a, 122b therein. In particular, on one such side, the first substrate member 102a has corresponding projected portion 120a and the second type of substrate member 104 has the projected portion 122a; and on other side, the second substrate member 102b has corresponding projected portion 120b and the second type of substrate member 104 has the projected portion 122b. Similar details may be contemplated for the volumetric display unit 100 of FIG. 5B, FIG. 5C and FIG. 5D and thus not explained herein for the brevity of the present disclosure.

Figure 6A:
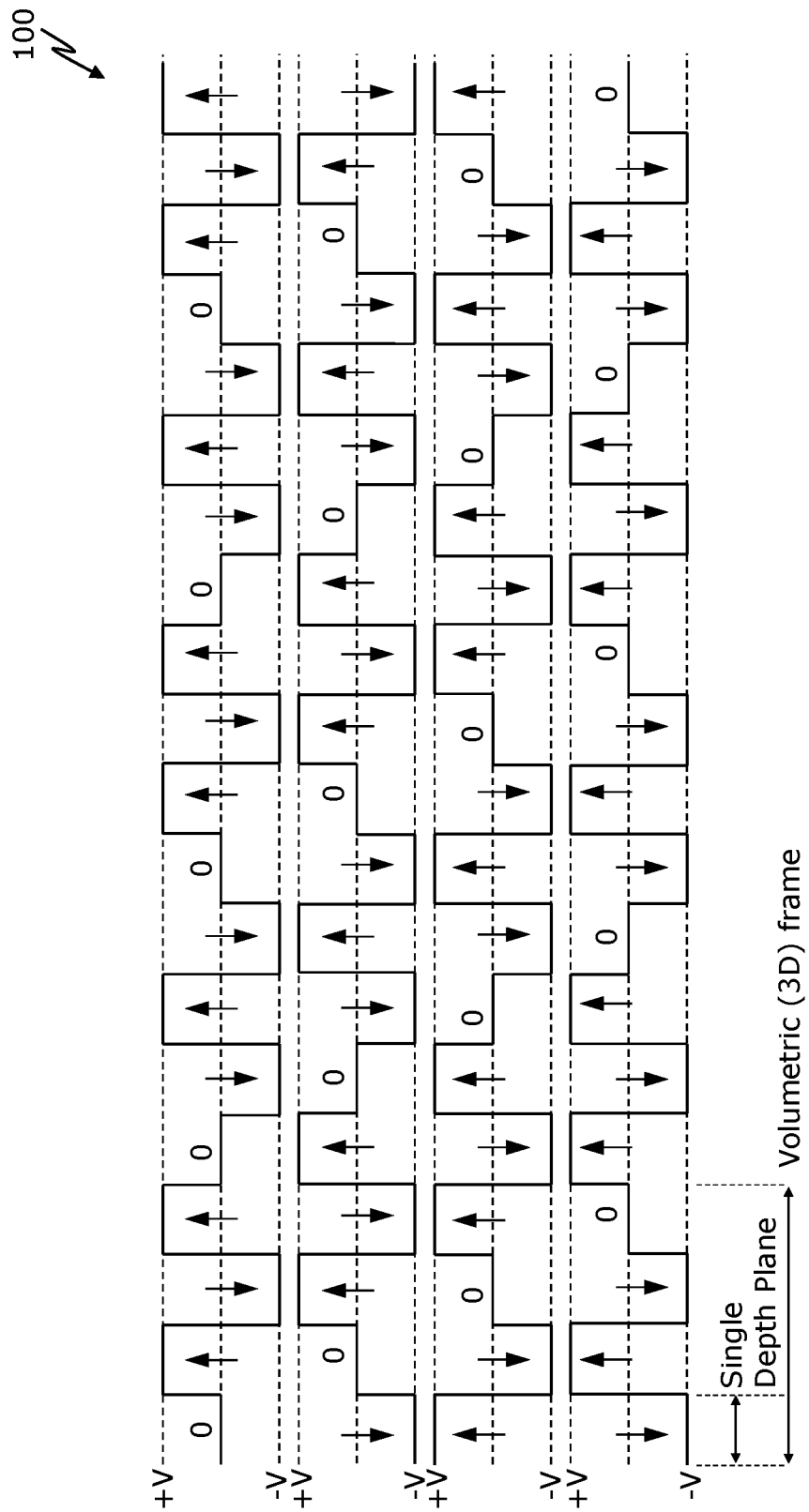
FIG. 6A is an exemplary illustration of a typical driving process of the volumetric display unit.

Referring to FIG. 6A, illustrated is an exemplary illustration of a typical driving process of a volumetric display unit. Herein, the liquid crystal diffuser is driven by applied voltage, creating an electric field across the active layer, which forces the liquid crystal (LC) molecules to align homeotropically, this is the transparent state of the diffuser element. When there is no electric field across the LC layer, the LC molecules collapses to a focal conic state, which is characterized as strongly light diffusing state (or screen mode), in which the diffuser can receive and visualize the image content (namely a graphical information attributed to a corresponding depth plane). To drive the LC to the homeotropic state a rather high electric field intensity is needed that can reach 10 MV/m or so and can go up to even 25 MV/m for brief moments. At such high electric field intensities, it becomes of utmost importance to drive the LC layer with alternating voltage to counter effects of unidirectional electric field for a prolonged duration. Charged particles and impurities found in the liquid crystal can migrate and agglomerate more easily when the unidirectional electric field is present. It is known issue in the field and is addressed by switching the polarity of the applied voltage cross the liquid crystal active layer. Furthermore, in a volumetric display application, a diffuser element spends most of the time energized (under applied electric field) and only during brief moment when its turn has come to receive a corresponding image depth plane, it configured to enter in a zero-field mode (screen mode). During the energized state, it is preferable to spend as little time as possible under unidirectional electric field, in order to extend the effective lifespan of a diffuser element and postpone a critical failure.

Figure 6B:
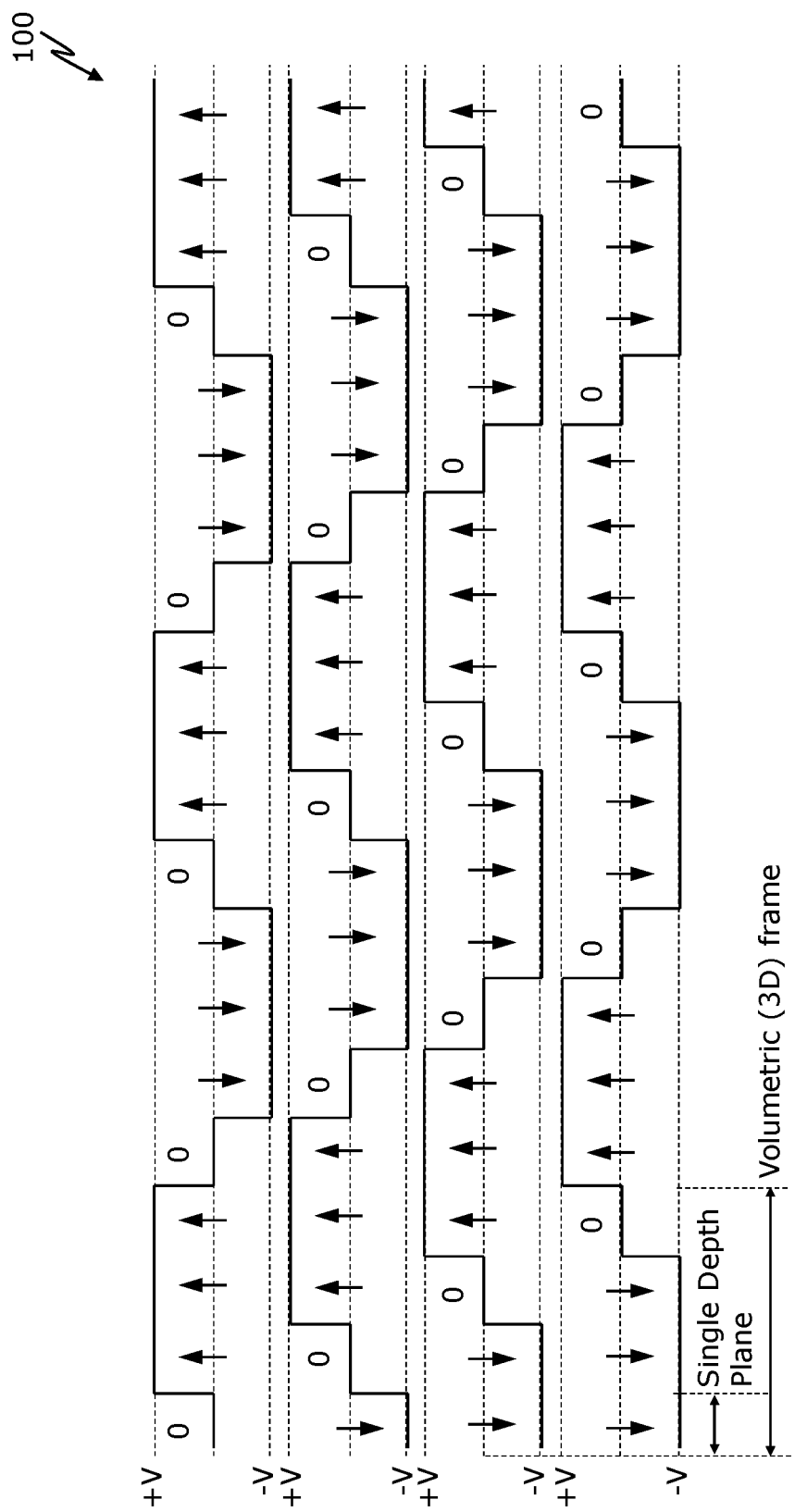
FIG. 6B is an exemplary illustration of a driving process of the volumetric display unit, in accordance with an embodiment of the present disclosure.

Referring to FIG. 6B, illustrated is an exemplary illustration of a driving process of the volumetric display unit 100, in accordance with an embodiment of the present disclosure. In the present example, a volumetric frame is shown to consist of N=4 subframes representing image depth planes. In this case, during a single volumetric frame each of the diffuser elements spends one subframe in the zero-field state while remaining 3 subframes are in a field-on state. In one of the embodiments, each diffuser element is subjected to unidirectional electric field during each volumetric frame. Nevertheless, in alternative and preferable implementation, the driving scheme foresees alternation between the electric field direction with each consecutive subframe. That is, during each energized sub-period (corresponds to a duration of 3 subframes) of the volumetric frame, the electric field direction is flipped (as shown) to opposite. This is beneficial as the liquid crystal element spends less time under unidirectional electric field which hinders mobility and agglomeration of charged defects and other impurities, thus prolonging the effective lifetime of a diffuser element and maintaining stable switching and optical characteristics. Furthermore, the preferred driving approach (as shown in FIG. 6B) minimizes crosstalk between the diffuser elements comprising the volumetric screen. While the cell gap in a typical embodiment of a diffuser elements is in a range of 4-30 micrometres, a thickness of substrates is approximately two orders of magnitude higher. In such case, the voltage across the cell gap can produce an electric field intensity on the order of 8-30 MV/m while the same voltage across the substrate and neighbouring cell gap would result in electric field intensities that are multiple tens to hundreds of times lower (on the order of 80-300 kV/m). Much lower electric field intensity typically will not substantially interfere with the operation of the liquid crystal layer; nevertheless, its presence preferably should be considered, and its effects countered when possible.

Figure 6C:
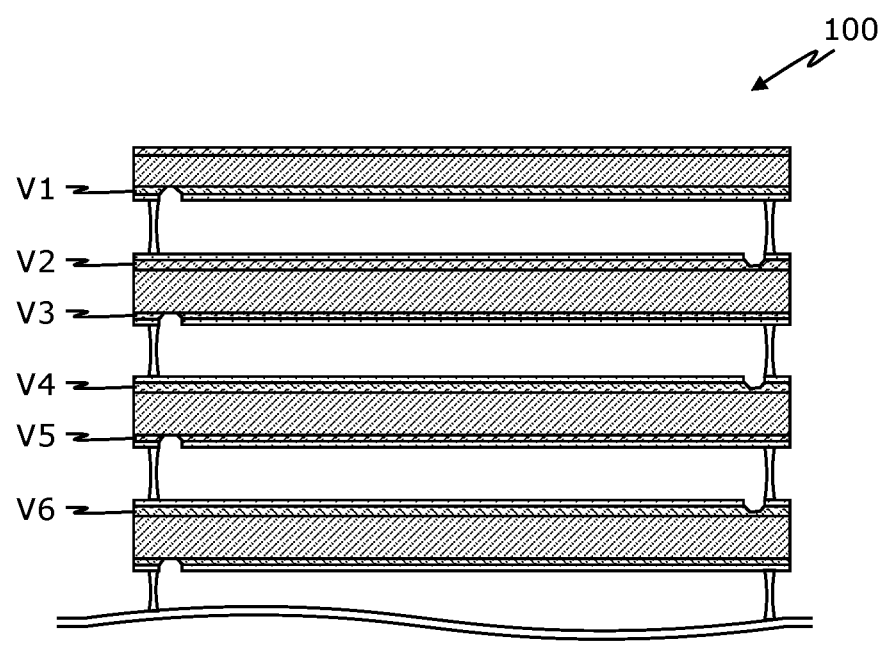
FIG. 6C is an exemplary illustration of a driving process of the volumetric display unit with three active layers, in accordance with an embodiment of the present disclosure.

Referring to FIG. 6C, illustrated is an exemplary illustration of a driving process of the volumetric display unit 100 with three active layers, in accordance with an embodiment of the present disclosure. Herein, a first layer is driven by applying electric potential V1 and V2 to the corresponding electrodes, a second layer is driven by applying electric potential V3 and V4 to the corresponding electrodes and a third layer is driven by applying electric potential V5 and V6 to the corresponding electrodes. Focusing on a particular case, when the potentials V3 and V4 are equal and substantially close to 0 (i.e., causing no electric field across the corresponding active liquid crystal layer) may cause the corresponding active liquid crystal layer to be in the diffusive state. In contrast, V1 and V2 are not equal and V5 and V6 are also unequal. In the given configuration, V1 is substantially equal to V6 and V2 is substantially equal to V5. With such configuration, electric field across the cell-gap of the diffuse active layer (corresponding to layer controlled by the potentials V3 and V4 is compensated and substantially close to zero. Thus, no crosstalk is experienced by the layer in the diffusive state. The effect is that no optical properties are adversely impacted, as no electric field is interfering with the focal-conic state trying to break-it. Secondly, when going through optical state transition (from diffuse to transparent and vice versa, no slow-down of the transition is experienced due to any residual cross-talk electric field.

Figure 7:
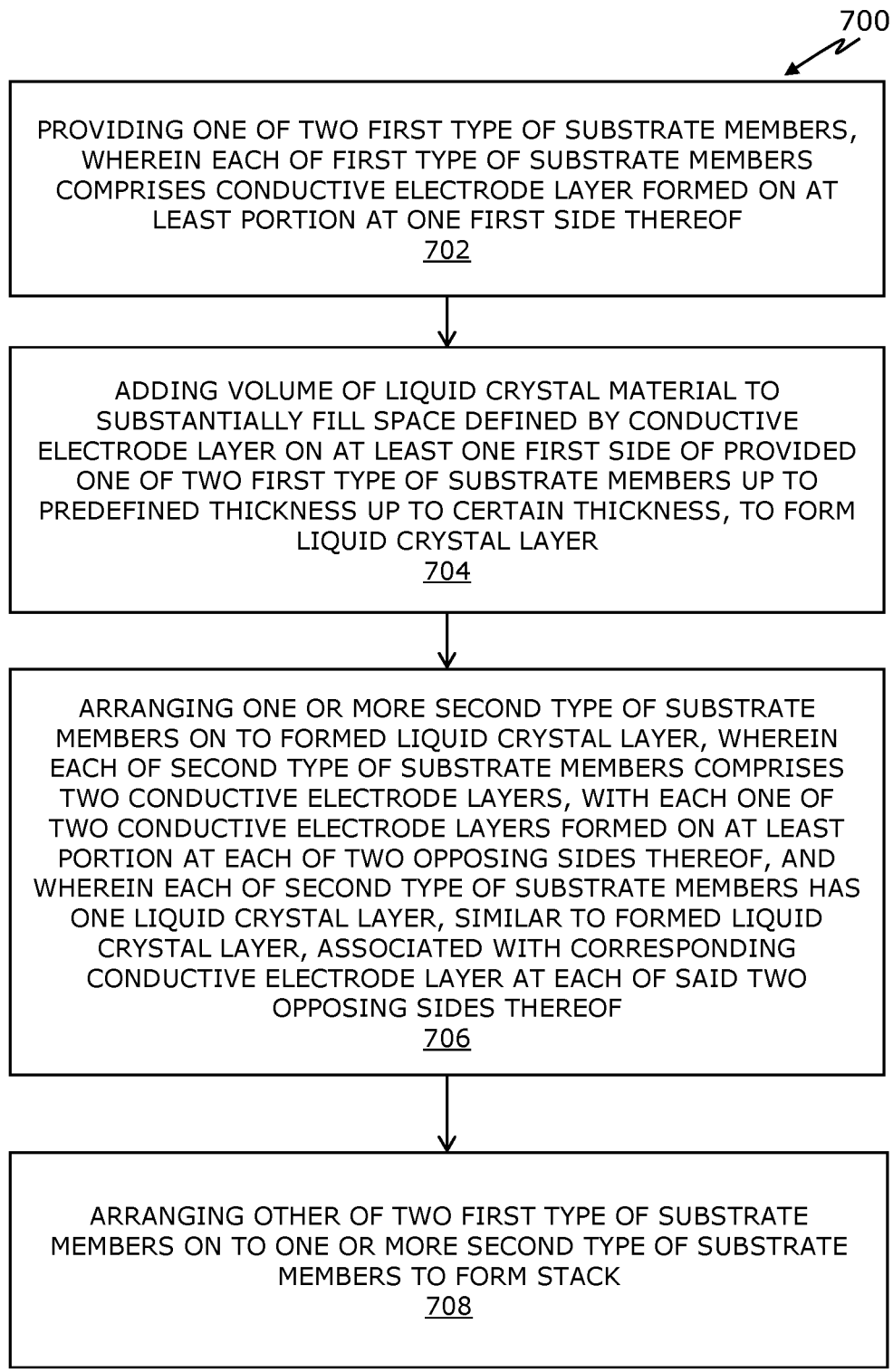
FIG. 7 is an exemplary flowchart of a method of manufacturing the volumetric display unit, in accordance with another embodiment of the present disclosure.

Referring to FIG. 7, illustrated is a flowchart listing steps involved in a method 700 of manufacturing the volumetric display unit 100, in accordance with an embodiment of the present disclosure. At step 702, the method 700 includes providing a first substrate member 102a, of two first type of substrate members 102a, 102b, comprising a conductive electrode layer 106a formed on at least a portion at a first side 108a thereof. In some embodiments, the method 700 further includes forming a notch 128 in each one of the conductive electrode layers 106a, 106b, 110a, 110b. At step 704, the method 700 includes adding a volume of liquid crystal material to fill a space corresponding to the conductive electrode layer 106a on the first side 108a of the first substrate member 102a up to a predefined thickness, to form one of liquid crystal layer of a plurality of liquid crystal layers 116. The method 700 also includes, before forming one of the liquid crystal layer of the plurality of liquid crystal layers 116, placing a gasket member 118 onto the first substrate member 102a to define the space for adding the volume of liquid crystal material to form one of liquid crystal layer of the plurality of liquid crystal layers 116, such that the gasket member 118 is arranged between the two of the conductive electrode layers 106a, 106b, 110a, 110b of two adjacent substrate members of the plurality of substrate members 102a, 102b, 104 in the formed stack 114 and circumscribes the corresponding one of the plurality of liquid crystal layers 116 disposed therewith. The method 700 further includes utilizing one-drop-fill (ODF) technique to add the volume of liquid crystal material. At step 706, the method 700 includes arranging one or more second type of substrate members 104 on to the formed liquid crystal layer of the plurality of liquid crystal layers 116, wherein each of the second type of substrate members 104 comprises two conductive electrode layers 110a, 110b, with each one of the two conductive electrode layers 110a, 110b formed on at least a portion at each one of two opposing sides 112a, 112b thereof, and wherein each of the second type of substrate members 104 has one liquid crystal layer of the plurality of liquid crystal layers 116 associated with each one of the two conductive electrode layers 110a, 110b. At step 708, the method 700 includes arranging a second substrate member 102b, of the two first type of substrate members 102a, 102b, comprising a conductive electrode layer 106b formed on at least a portion at a first side 108b thereof on to the one or more second type of substrate members 104, with the first sides 108a, 108b of the two first type of substrate members 102a, 102b facing each other, to form a stack 114.

The method 700 further includes cutting the first substrate member 102a to define a projected portion 120a extending from an edge of the portion onto which the conductive electrode layer 106a is formed thereat; cutting the second substrate member 102b to define a projected portion 120b extending from an edge of the portion onto which the conductive electrode layer 106b is formed thereat; and cutting each of the second type of substrate members 104 to define two projected portions 122a, 122b extending from one or more edges of the portion onto which the two conductive electrode layers 110a, 110b are formed thereat. The method 700 also includes disposing a connection terminal 124a on the projected portion 120a of the first substrate member 102a; disposing a connection terminal 124b on the projected portion 120b of the second substrate member 102b; and disposing two connection terminals 126a, 126b on the two projected portions 122a, 122b of each of the second type of substrate members 104, with each one of the two connection terminals 126a, 126b disposed on different one of the two projected portions 122a, 122b. The method 700 further includes disposing the connection terminals 124a, 124b, 126a, 126b of the plurality of substrate members 102a, 102b, 104 in the formed stack 114 to be non-overlapping.

Figure 8A:
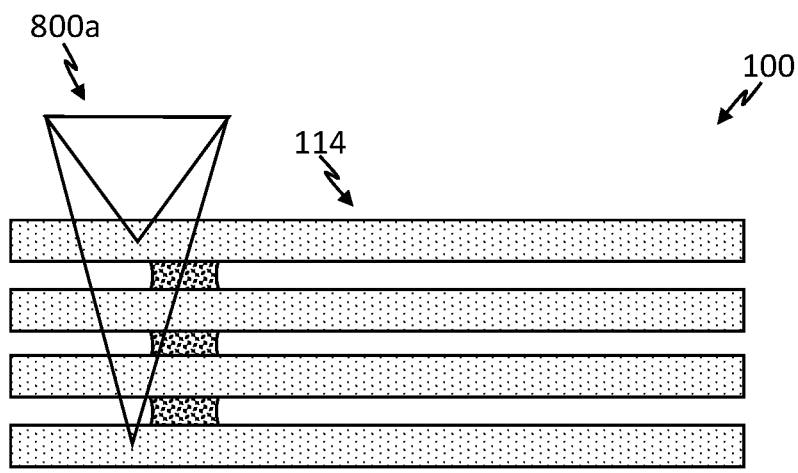
FIG. 8A is an exemplary illustration of a typical cutting process of the stack of the volumetric display unit.
Figure 8B:
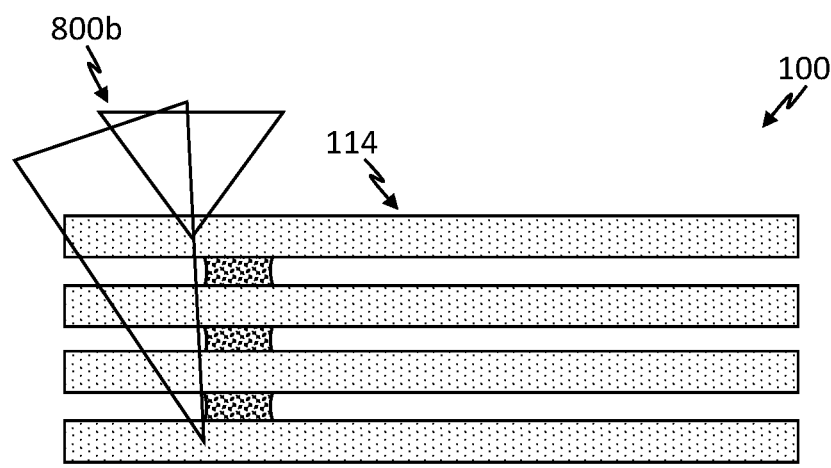
FIG. 8B is an exemplary illustration of a cutting process of the stack of the volumetric display unit, in accordance with an embodiment of the present disclosure.

The method 700 includes implementing laser ablation for the cutting of the first substrate member 102a, the second substrate member 102b and each of the second type of substrate members 104 in the formed stack 114. Referring to FIG. 8A, illustrated is an exemplary illustration of a typical cutting process of the stack 114 of the volumetric display unit 100. As shown, a laser beam 800a is implemented for the cutting process. The method 700 further includes off-setting and/or tilting a laser beam, during implementing the laser ablation, to define edges for the cutting of the first substrate member 102a, the second substrate member 102b and each of the second type of substrate members 104 in the formed stack 114. Referring to FIG. 8B, illustrated is an exemplary illustration of a cutting process of the stack 114 of the volumetric display unit 100, in accordance with an embodiment of the present disclosure. As shown, a laser beam 800b which is off-set and/or tilted is implemented for the cutting process.

Figure 9:
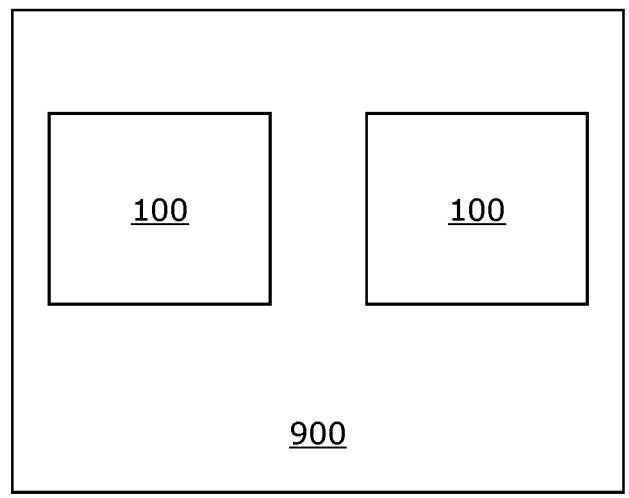
FIG. 9 is a simplified illustration of a display apparatus comprising the volumetric display unit, in accordance with an embodiment of the present disclosure.

Referring to FIG. 9, illustrated is simplified illustration of a display apparatus 900 including the volumetric display unit 100, in accordance with an embodiment of the present disclosure. In an embodiment, the display apparatus 900 is a head-mounted near eye display. In an embodiment, the display apparatus 900 is a heads-up display.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A volumetric display unit comprising:
   a plurality of substrate members comprising:
      two first type of substrate members comprising a first substrate member and a second substrate member, wherein the first substrate member comprises a conductive electrode layer formed on at least a portion at a first side thereof and the second substrate member comprises a conductive electrode layer formed on at least a portion at a first side thereof; and
      one or more second type of substrate members, wherein each of the second type of substrate members comprises two conductive electrode layers, with each one of the two conductive electrode layers formed on at least a portion at each one of two opposing sides thereof,
      wherein the plurality of substrate members are arranged to form a stack, such that the two first type of substrate members form outer layers of the stack, with the first sides of the two first type of substrate members facing each other, and the second type of substrate members form inner layer(s) of the stack sandwiched between the two first type of substrate members; and
   a plurality of liquid crystal layers, wherein each one of the plurality of liquid crystal layers is separately disposed between two of the conductive electrode layers of two adjacent substrate members of the plurality of substrate members in the formed stack and wherein the plurality of liquid crystal layers are of a polymer-free cholesteric liquid crystal variety and a thickness of each one of the plurality of liquid crystal layers is in a range of 4 microns to 30 microns.

2. The volumetric display unit according to claim 1 further comprising a gasket member arranged between the two of the conductive electrode layers of two adjacent substrate members of the plurality of substrate members in the formed stack.

3. The volumetric display unit according to claim 2, wherein the gasket member circumscribes the corresponding one of the plurality of liquid crystal layers disposed therewith.

4. The volumetric display unit according to claim 1, in which each of the conductive electrode layers is additionally, at least in a region circumscribed by a gasket member, coated with a dense dielectric barrier and alignment layer.

5. The volumetric display unit according to claim 1, wherein:
   the first substrate member comprises a projected portion extending from an edge of the portion onto which the extension of a conductive electrode layer is formed thereat;
   the second substrate member comprises a projected portion extending from an edge of the portion onto which the extension of a conductive electrode layer is formed thereat; and
   each of the second type of substrate members comprises two projected portions extending from one or more edges of the portion onto which the two corresponding extensions of conductive electrode layers are formed thereat.

6. The volumetric display unit according to claim 5, wherein:
   the first substrate member comprises a connection terminal disposed on the projected portion thereof;
   the second substrate member comprises a connection terminal disposed on the projected portion thereof; and
   each of the second type of substrate members comprises two connection terminals, with each one of the two connection terminals disposed on different one of the two projected portions thereof.

7. The volumetric display unit according to claim 6, wherein the connection terminals of the plurality of substrate members in the formed stack are non-overlapping.

8. The volumetric display unit according to claim 1, wherein each one of the conductive electrode layers has a notch formed therein.

9. A display apparatus comprising a volumetric display unit according to claim 1.

10. The display apparatus according to claim 9, wherein the display apparatus is a head-mounted near eye display.

11. The display apparatus according to claim 9, wherein the display apparatus is a head-up display.

12. A method of manufacturing a volumetric display unit, the method comprising:
   providing a first substrate member, of two first type of substrate members, comprising a conductive electrode layer formed on at least a portion at a first side thereof;
   adding a volume of liquid crystal material to fill a space corresponding to at least a part of the conductive electrode layer on the first side of the first substrate member up to a predefined thickness, to form one liquid crystal layer of a plurality of liquid crystal layers, wherein the plurality of liquid crystal layers are of a polymer-free cholesteric liquid crystal variety and a thickness of each one of the plurality of liquid crystal layers is in a range of 4 microns to 30 microns;
   arranging one or more second type of substrate members on to the formed liquid crystal layer of the plurality of liquid crystal layers, wherein each of the second type of substrate members comprises two conductive electrode layers, with each one of the two conductive electrode layers formed on at least a portion at each one of two opposing sides thereof, and wherein each of the second type of substrate members has one liquid crystal layer dispensed thereon of the plurality of liquid crystal layers associated with each one of the two conductive electrode layers of adjacent substrate members; and
   arranging a second substrate member, of the two first type of substrate members, comprising a conductive electrode layer formed on at least a portion at a first side thereof on to the one or more second type of substrate members, with the first sides of the two first type of substrate members facing each other, to form a stack.

13. The method according to claim 12 further comprising, before forming one of the liquid crystal layer of the plurality of liquid crystal layers, disposing a gasket member onto the first substrate member to define the space for adding the volume of liquid crystal material to form one of liquid crystal layer of the plurality of liquid crystal layers, such that the gasket member is arranged between the two of the conductive electrode layers of two adjacent substrate members of the plurality of substrate members in the formed stack and circumscribes the corresponding one of the plurality of liquid crystal layers disposed therewith.

14. The method according to claim 12 further comprising:
   cutting the first substrate member to define a projected portion extending from an edge of the portion onto which a extension of the conductive electrode layer is formed thereat;
   cutting the second substrate member to define a projected portion extending from an edge of the portion onto which the extension of the conductive electrode layer is formed thereat; and
   cutting each of the second type of substrate members to define two projected portions extending from one or more edges of the portion onto which the corresponding two extensions of the conductive electrode layers are formed thereat.

15. The method according to claim 14 further comprising implementing laser ablation for the cutting of the first substrate member, the second substrate member and each of the second type of substrate members in the formed stack.

16. The method according to claim 15 further comprising offsetting and/or tilting a laser beam, during implementing the laser ablation, to define edges for the cutting of the first substrate member, the second substrate member and each of the second type of substrate members in the formed stack.

17. The method according to claim 14 further comprising:
   disposing a connection terminal on the projected portion of the first substrate member;
   disposing a connection terminal on the projected portion of the second substrate member; and
   disposing two connection terminals on the two projected portions of each of the second type of substrate members, with each one of the two connection terminals disposed on different one of the two projected portions.

18. The method according to claim 17 further comprising disposing the connection terminals of the plurality of substrate members in the formed stack to be non-overlapping.

19. The method according to claim 12 further comprising forming a notch in each one of the conductive electrode layers.

20. The method according to claim 12 further comprising utilizing one-drop-fill (ODF) technique to add the volume of liquid crystal material.

* * * * *